United States Patent [19]

White

[11] Patent Number: 4,970,674

[45] Date of Patent: Nov. 13, 1990

[54] PROGRAMMABLE WINDOWING FFT DEVICE WITH REDUCED MEMORY REQUIREMENTS

[75] Inventor: Stanley A. White, San Clemente, Calif.

[73] Assignee: Rockwell International Corporation, El Segundo, Calif.

[21] Appl. No.: 418,812

[22] Filed: Oct. 3, 1989

Related U.S. Application Data

[63] Continuation of Ser. No. 166,274, Mar. 10, 1988, abandoned.

[51] Int. Cl.$^5$ .......................................... G06F 15/332
[52] U.S. Cl. .................................................. 364/726
[58] Field of Search ........................ 364/726, 754, 757

[56] References Cited

U.S. PATENT DOCUMENTS

| | | | |
|---|---|---|---|
| 4,275,452 | 6/1981 | White | 364/726 |
| 4,344,151 | 8/1982 | White | 364/754 |
| 4,680,727 | 7/1987 | White | 364/754 |
| 4,689,762 | 8/1987 | Thibodeau | 364/726 |

OTHER PUBLICATIONS

Hemel, "Making small ROM's do math quickly, cheaply & easily" *Electronics* May 11, 1970, pp. 104–111.

Kaiser et al "Digital Filters for High Speed Data Processing" Advanced Technology Labs. Defense Electronic Products RCA Camden, New Jersey, Tech. Report AFAL-TR-70-204, Sep. 1970, pp. 7-1 thru 7-19.

*Primary Examiner*—David H. Malzahn
*Attorney, Agent, or Firm*—H. Fredrick Hamann; George A. Montanye; David J. Arthur

[57] ABSTRACT

An FFT building block useful in building FFT arrays includes a discrete-Fourier-transform device (DFT) having a plurality of DFT input lines, and a plurality of multipliers. Each multiplier has a multiplier-input line and a multiplier-output line. The multiplier-output line of each multiplier is connected to a corresponding DFT input line. Each multiplier implements distributed arithmetic to produce at the multiplier output a value corresponding to a combination of a value on the multiplier-input line and a predetermined multiplier coefficient.

20 Claims, 12 Drawing Sheets

| BIT NUMBER | | | | |
|---|---|---|---|---|
| L 3 | 3 | 7 | 11 | 15 |
| I 2 | 2 | 6 | 10 | 14 |
| N 1 | 1 | 5 | 9 | 13 |
| E 0 | 0 | 4 | 8 | 12 |
| # | 4 | 3 | 2 | 1 |
| | | CLOCK NUMBER | | |

FIG.16B

| BIT NUMBER | | | | |
|---|---|---|---|---|
| L 3 | 3 | 7 | 11 | 15 |
| I 2 | 2 | 6 | 10 | 14 |
| N 1 | 1 | 5 | 9 | 13 |
| E 0 | 0 | 4 | 8 | 12 |
| # −1 | | | | |
| | 4 | 3 | 2 | 1 |
| | | CLOCK NUMBER | | |

FIG.16C

| L 3 | 3 | 7 | 11 | 15 |
|---|---|---|---|---|
| I 2 | 2 | 6 | 10 | 14 |
| N 1 | 1 | 5 | 9 | 13 |
| E 0 | 0 | 4 | 8 | 12 |
| # −1 | | | | |
| −2 | | | | |
| | 4 | 3 | 2 | 1 |
| | | CLOCK NUMBER | | |

FIG.16D

| L 1 | 1 | 5 | 9 | 13 |
|---|---|---|---|---|
| I 0 | 0 | 4 | 8 | 12 |
| N −1 | −1 | 3 | 7 | 11 |
| E −2 | −2 | 2 | 6 | 10 |
| # | 4 | 3 | 2 | 1 |
| | | CLOCK NUMBER | | |

PROGRAMMABLE WINDOWING FFT DEVICE WITH REDUCED MEMORY REQUIREMENTS

The invention herein described was made in the course of or under a contract or subcontract thereunder, with the Department of the Navy.

This is a continuation of copending application(s) Ser. No. 07/166,274 filed on 03/10/88, now abandoned.

BACKGROUND OF THE INVENTION

For the processing of 16-bit real and 16-bit imaginary data there is a remarkable advantage of using the 4-bit-at-a-time (4BAAT) distributed arithmetic (DA) four-point discrete Fourier transform (DFT). It is known that by addressing the proper segments of read-only memories (ROMs) through pin programming, one device type can be used throughout an array of devices to make high-speed FFTs. Such one-chip high-speed FFTs also permit one-chip windowing, but the window coefficients in the ROM restrict both the size of the transform and the window type that may be implemented because of the limitations on memory size.

Figure 1:
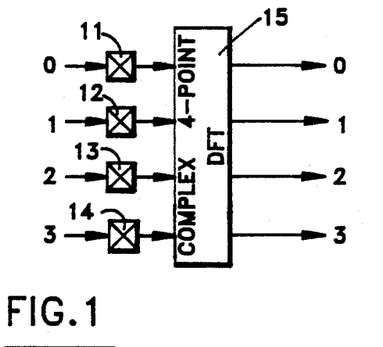
FIG. 1 is a simplified block diagram of a complex four-point decimate-in-time FFT building block with window multipliers for the input stage (first tier) of an FFT.

Referring to FIG. 1, a simplified block diagram of the configuration of a first tier device in a radix four decimate-in-time (DIT) FFT-device array is shown. Signals must be "windowed" to control artifacts introduced by the finite length of the digital signal data record.

In a decimate-in-time type device, windowing is performed by multiplying each input signal sample by a suitable real time-domain-weighting coefficient. The four inputs, labeled 0-3, are complex, and may be, for example, in 16-bit, 2's-complement, fixed-point format. Both the real data and the imaginary data are multiplied by a real window coefficient in the multiplier 11-14 coupled in each input line. Each multiplier block shown in FIG. 1 may consist of a pair of real multipliers, one for the real data, and one for the imaginary data. The complex four-point-DFT block 15 is a multiplier-free collection of adders. The output of the DFT consists of four complex outputs, each on its own output line. The output lines are then connected to the inputs of building blocks of subsequent tiers of the array.

Figure 2:
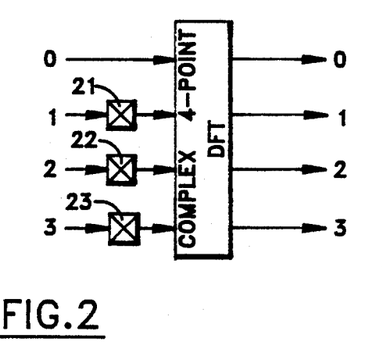
FIG. 2 is a simplified block diagram of a complex four-point decimate-in-time FFT building block with "twiddle-factor" multipliers for subsequent stages of the FFT.

FIG. 2 illustrates a building block that may be used in the second and subsequent stages or tiers of the FFT-device array. The difference between the building block of FIG. 2 and that of FIG. 1 is that the building block of FIG. 2 only requires three multipliers 21-23 on three of the input lines for implementing the "twiddle-factor" coefficients associated with the appropriate tier qr stage. But, those multipliers must be fully complex to implement those twiddle-factor coefficients.

Figure 3:
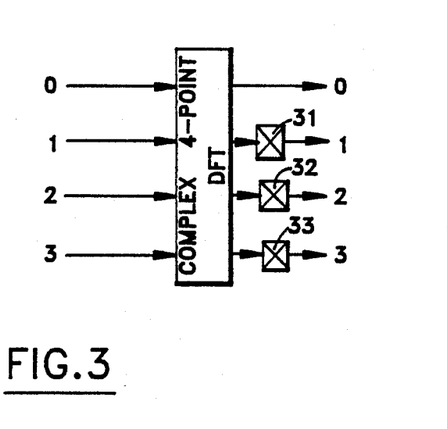
FIG. 3 illustrates a complex four-point decimate in frequency FFT building block with twiddle-factor multipliers.

The decimate-in-time structures of FIGS. 1 and 2 may be compared with the building blocks suitable for a decimate-in-frequency (DIF) FFT device shown in FIG. 3. In the DIF type device, the twiddle-factor multipliers 31-33 are on the output lines from the complex four-point DFT. An array of DIF transformers has slightly worse system computational noise that DIT transformers. This degradation in noise is generally found to be approximately three db.

SUMMARY OF THE INVENTION

With the present invention, the distributed arithmetic coefficients need not be all stored on the FFT chip. All of the values that are needed can be computed on the chip when the device is turned on, and stored on the FFT device in a random-access memory (RAM) from the contents of a relatively small ROM. In addition, the window coefficients (whicn are tailored for the job) may be contained in an outboard ROM, loaded at turn-on, and stored on the FFT device in a relatively small RAM. A set of "standard" FFT-device coefficients may also be stored in a ROM that is a part of the FFT device.

The FFT building block device of the invention includes a discrete Fourier transform device (DFT) that has a plurality of DFT input lines and a plurality of multipliers. Each multiplier has a multiplier input line and a multiplier-output line. The multiplier-output line of each multiplier is connected to a corresponding DFT input line. Each multiplier implements distributed arithmetic to produce at the multiplier output a combination of a value on the multiplier input line and a predetermined multiplier coefficient.

DETAILED DESCRIPTION OF THE PREFERRED EMBODIMENT

The present invention is a Fast Fourier Transform building block device that may be assembled into an array of such devices. With the invention, the same building block may be used in all tiers or stages of the array.

Figure 4:
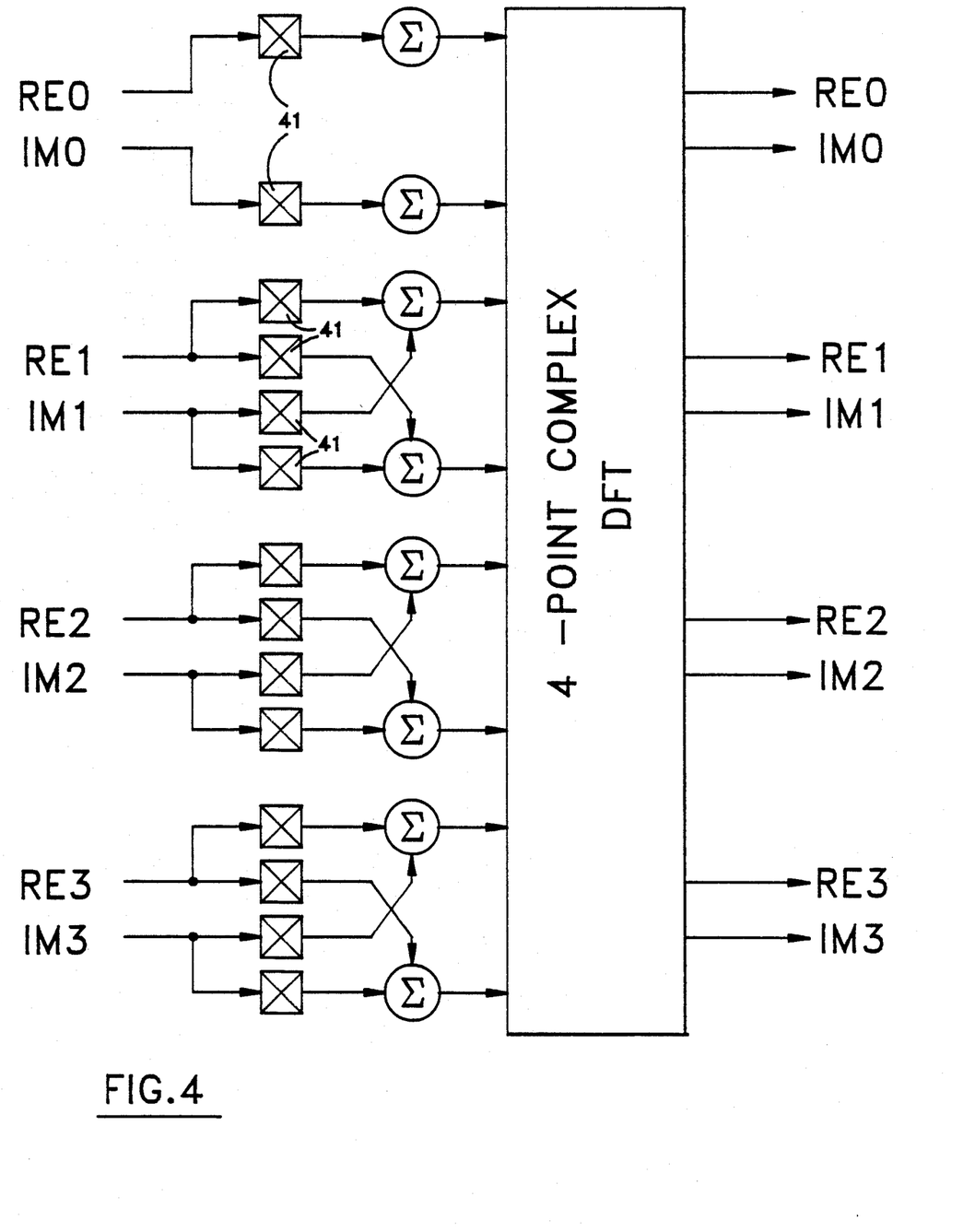
FIG. 4 is a functional block diagram of a four-point decimate-in-time FFT building block constructed using 14 real multipliers.

Viewing the DIT building blocks of FIGS. 1 and 2, it can be seen that by adding a fourth (but real rather than complex) multiplier to a DIT building block, windowing may be accommodated with the building block. This is illustrated in simplified form in FIG. 4, which shows the 14 real multipliers 41 that could accomplish such a DIT FFT building block. The structure shown in FIG. 4 may be used to implement the building blocks of both FIG. 1 and FIG. 2. But, the structure of FIG. 4 is of limited practical use because of the difficulty in incorporating 14 such multipliers in a high-speed, low-power device. A device with 14 such multipliers would likely be complex, expensive, have a low yield, and have some significant input/output problems.

Another possibility might be to use 32 input pins and 32 output pins, which would correspond to the 32 bits in the complex input and output words. For a four-word input and four-word output, then four clock periods would be the minimum time required to load input data or to unload output data. Four clock periods would therefore be the time in which the arithmetic structure would be loaded. Four clock periods would also be the throughput rate and the epoch time. For an exemplary 40-MHz clock frequency, an epoch time of 100 nanoseconds can be achieved. With multiplication at the rate of 14 multiplies per four clock periods, a minimum of four hardware multipliers would be required on the chip. For current 2-micron CMOS/SOS technology, such a requirement would be inordinately complicated.

DATA ORGANIZATION

To solve these problems in the invention, the input data and the output data may be formatted four bits at a time (4BAAT), with the least-significant bits proceeding first. The four bits of real data and four bits of imaginary data for each input (0 through 3) may be paired, to have one byte of each of four inputs applied during each clock period on the 32 input pins. The input data rate then is still one complex word per clock period.

REAL MULTIPLIER

The first complex input line 0 (see FIG. 1), consisting of a real channel RE0 and an imaginary channel IM0, requires only a scalar, real multiplier 11. The multiplier has four clock periods in which to operate, as four clock periods are required to load the data into the four point complex DFT.

If the input on each channel of the first input line is designated "A", and the multiplicative weighting coefficient is "w", then the output of the multiplier is the product P=Aw.

For a 16-bit, 2's complement word, the value A consists of the sum of the bits a, appropriately factored. With the input data word A formatted four-bits at at time, it can be shown that the product P equals the sum of partial products $P_n(a)$ and an initial condition value $P_{IC}$;

$$A = -a_o + \sum_{n=1}^{15} a_n 2^{-n} \quad (1)$$

The negative of A is:

$$-A = -a_o + \sum_{n=1}^{15} a_n 2^{-n} + 2^{-15} \quad (2)$$

Therefore, as $A = \frac{1}{2}[A - (-A)]$:

$$A = \frac{1}{2}\left[ -(a_o - a_o) + \sum_{n=1}^{15} (a_n - a_n) 2^{-n} - 2^{-15} \right] \quad (3)$$

The product P may be expressed:

$$P = \frac{w}{2}\left[ -(a_o - a_o) + \sum_{n=1}^{15} (a_n - a_n) 2^{-n} - 2^{-15} \right] \quad (4)$$

or:

$$P = \sum_{l=0}^{3} P_l 2^{-4l} + P_{IC} 2^{-12} \quad (5)$$

in which:

$$P_o = \frac{w}{2}\left[ -(a_o - a_o) + \sum_{n=1}^{3} (a_n - a_n) 2^{-n} \right] \quad (6)$$

and $$P_l = \frac{w}{2} \sum_{n=1}^{3} (a_{n+4l} - a_{n+4l}) 2^{-n} \quad (7)$$

and $$P_{IC} = -\frac{w}{2} 2^{-3} \quad (7a)$$

In the scalar multiplier used in the invention, the partial products $P_n(a)$ may be precomputed, stored in a random-access memory (RAM), and addressed by the bits a of the input A, four bits at a time. Additionally, the initial condition $P_{IC}$ may be similarly precomputed and stored on the device.

When the FFT building block is first turned on, it computes the initial-condition values PIC and the partial products $P_n(a)$ values for all bits a, and stores those values. Because of repetition, only a relatively few distinct values need to be stored. Also, because the individual building block device is pin programmed to know where it sits in the array of devices, the building block may be computed from a library of coefficients w, the set of eight partial-product values $P_n(a)$ values to a 16-bit accuracy, for storage in its own multiplier coefficient RAM. The library of w weighting coefficients may be stored in a ROM, or may be stored in an externally loaded RAM for use by the building block device.

Figure 5:
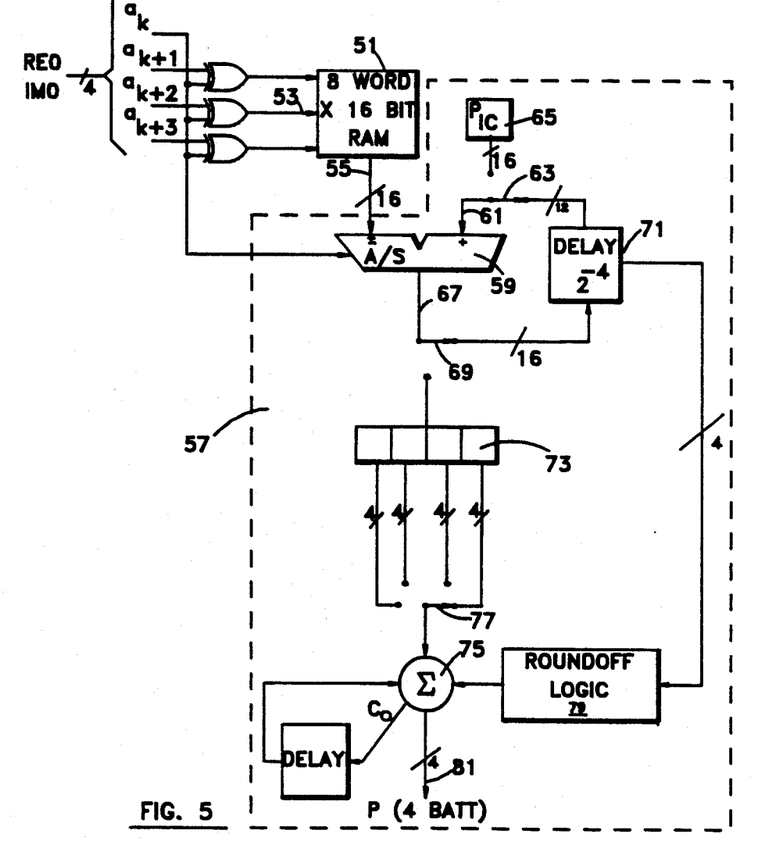
FIG. 5 illustrates a scalar multiplier for the present invention for performing real multiplication.

The preferred embodiment of the scalar multiplier is shown in FIG. 5. The partial products $P_n(a)$ are stored in the RAM 51, which preferably has capacity for eight words, each of sixteen bits. The RAM is addressed by the input lines 53 carrying the bits $a_k$, $a_{k+1}$, $a_{k+2}$, and $a_{k+3}$.

Figure 6:
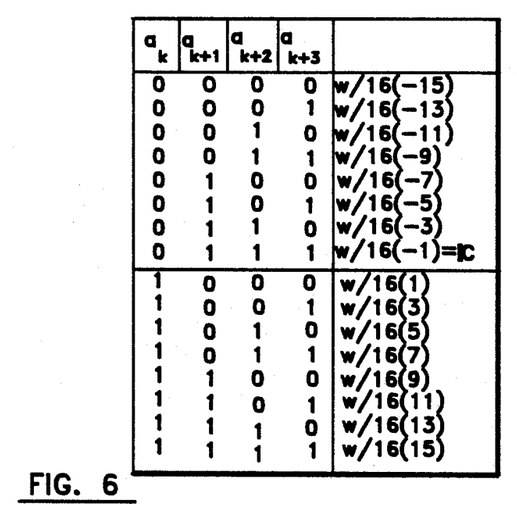
FIG. 6 is a table of partial-product values to be stored in the random-access memory of the multiplier of FIG. 5.

Each address on the input lines causes the corresponding appropriate partial product to be read out on the sixteen-bit memory output line 55. The partial-product values that may be stored in the RAM 51 are as shown, in the table of FIG. 6. Preferably, only the top half of the table shown in FIG. 6 need be stored in the RAM of the multiplier, as the most-significant bit $a_k$ may be used to control whether the accumulator 57 connected to the memory output adds or subtracts the value read out from the RAM. This cuts the memory requirement in half.

Figure 9:
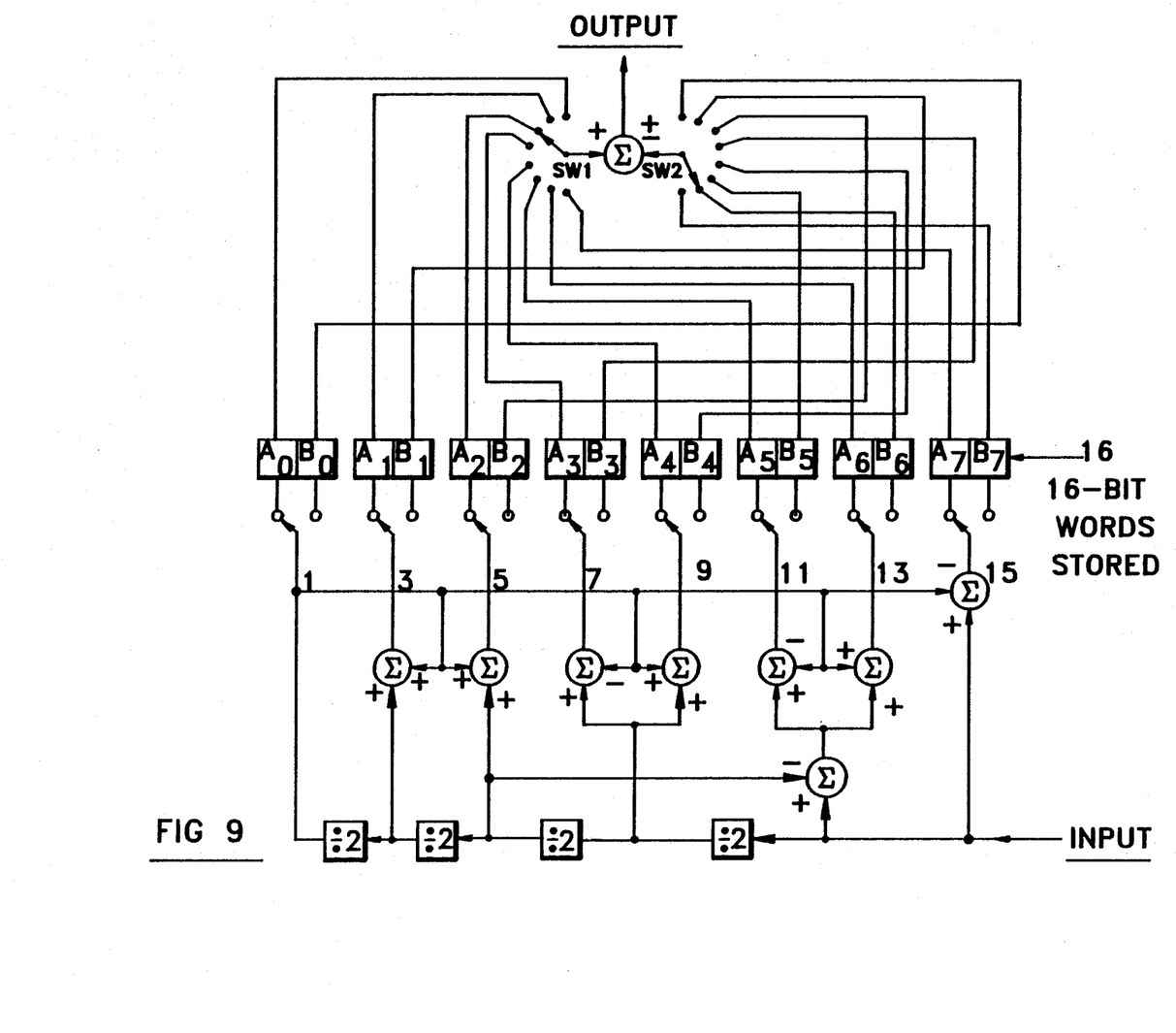
FIG. 9 is a block diagram of a partial-product generator that may be used with the structure of the invention for generating the partial products to be stored in the memories of the multipliers shown in FIG. 8.

The multiplier shown in FIG. 5 relies on a separate partial-product generator to generate the values stored in the RAM 51. An exemplary partial-product generator is illustrated in FIG. 9, and will be discussed later.

The 16-bit words are read out of the RAM into the adder 59 of the adder/accumulator 57, and are either added to or subtracted from the other input 61, depending on the input received from the input line $a_k$. During the first clock period of each multiplication cycle, a switch 63 connects the second input 61 of the adder 59 to an initial condition register 65, in which the initial condition partial product $P_{IC}$ is stored. During subsequent clock periods of each multiplication cycle, the switch 63 connects the second adder-output 61 to a feedback of the adder output from the previous clock period, appropriately shifted. The adder-output line 67 is connected by a switch 69 to the input of a delay and shift element 71. This element 71 delays the output one clock period and right-shifts the output four places to put it in alignment with the partial-product generated by the input of the next four most significant bits. The switch 63 connects the output of the delay element to the second input 61 of the adder 59 during the second and subsequent clock periods.

Thus, in the first period, the initial condition $P_{IC}$ and the partial product $P_3$ are combined in the adder 59. During the second clock period, the previous result (adder output) is right shifted four places and added to $P_2$, which is read out from the memory into the first adder input. During the third clock period, the result of the addition that took place during the second clock period is right-shifted four places, and added to the partial product $P_1$ read out from the memory. Finally, in the fourth and last clock period, the result of the addition that took place during the third clock period is also right shifted four places, and added to the partial product $P_0$.

During the fourth period, the switch 69 on the adder output 67 is switched to connect the adder output to a 16-bit buffer 73, into which the result of the addition that takes place during the fourth clock periods is stored in the buffer. During the next four clock periods, the values stored in the buffer are taken from the buffer four bits at a time. During each clock period, the input of an adder 75 is connected by a switch 77 to receive a different four bits of the adder output buffer 73. The adder 75 combines each four bit output with a delayed feedback and with the output of adder roundoff logic 79, and outputs the product P four bits at a time on the adder-/accumulator output line 81. This process is conducted while the adder is processing the partial products for the subsequent input bits.

Figure 7:
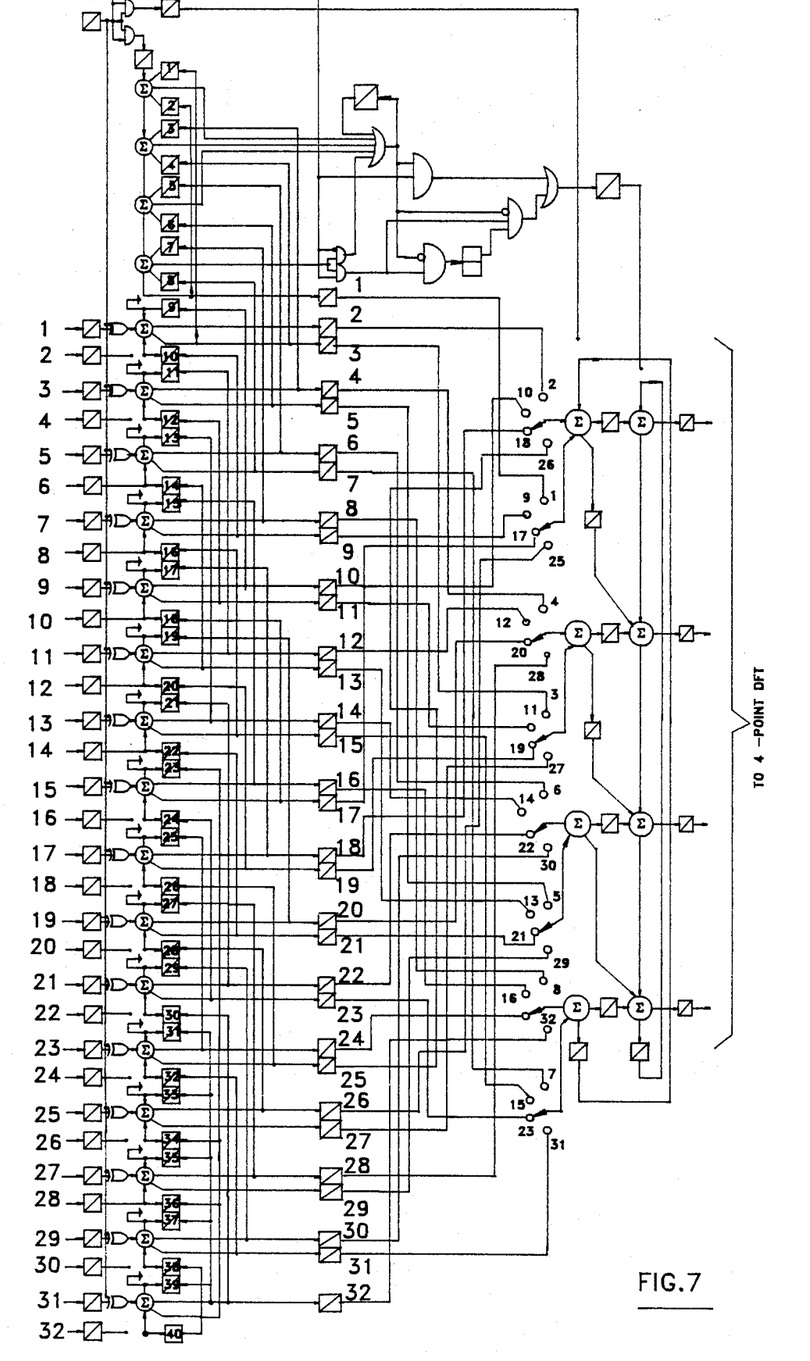
FIG. 7 is a detailed block diagram of the accumulator of the scalar multiplier of FIG. 5.

A structure for the adder/accumulator 57 is shown in much greater detail in FIG. 7.

COMPLEX MULTIPLIER

As mentioned above, complex multipliers 21, 22, 23 are required on the input lines 1, 2, and 3 (see FIG. 2). These complex multipliers, in the universal building block of the invention, are called upon to operate in one of two modes. If the building block device is located in the first tier of devices of the FFT (FIG. 1), the multiplier will function as a pair of real multipliers, with each one of the pair operating as the multiplier shown in FIG. 5 and described above under the heading "Real Multiplier". If the device is located in a subsequent tier of devices, the multiplication to be performed by the multiplier is a complex multiplication.

The input to the multiplier is the complex word $A+jB$. The weighting or multiplier coefficient $W_n^k$ is a complex word with a cosine function of k as the real component and the sign function of k as the imaginary component. The product P is the multiplied combination of the input $A+jB$ and the weighting coefficient $W_n^k$.

$$W_N^k = \cos\frac{2\pi k}{N} - j\sin\frac{2\pi k}{N} \tag{8}$$

The complex product P is the product of $W_n^k$ and the complex input;

$$P = W_n^k (A + jB) \tag{9}$$

$$P = (A + jB)\left(\cos\frac{2\pi k}{N} - j\sin\frac{2\pi k}{N}\right) = \tag{10}$$

$$\left[A\cos\frac{2\pi k}{N} + B\sin\frac{2\pi k}{N}\right] + j\left[B\cos\frac{2\pi k}{N} - A\sin\frac{2\pi k}{N}\right] \tag{11}$$

If A is the sum of bits a:

$$A = -a_o + \sum_{n=1}^{15} a_n 2^{-n} \tag{12}$$

As with the real multiplier, let $$A = -a_o + \sum_{n=1}^{15} a_n 2^{-n} = \tag{13}$$

$$\frac{1}{2}\left[-(a_o - a_o) + \sum_{n=1}^{15} (a_n - a_n) 2^{-n} - 2^{-15}\right]$$

B may be the sum of bits b:
Similarly, let $$B = -b_o + \sum_{n=1}^{15} b_n 2^{-n} = \tag{14}$$

$$\frac{1}{2}\left[-(b_o - b_o) + \sum_{n=1}^{15} (b_n - b_n) 2^{-n} - 2^{-15}\right]$$

Define $$P = R + jQ \tag{15}$$

where R and Q are both real-valued quantities, then

The output P may be expressed as a complex number $R+jQ$, in which R and Q are both real value quantities:

$$R = \frac{1}{2}\left[-(a_o - a_o) + \sum_{n=1}^{15} (a_n - a_n) 2^{-n} - 2^{-15}\right]\cos\frac{2\pi k}{N} + \tag{16}$$

-continued $$\frac{1}{2}\left[-(b_o - b_o) + \sum_{n=1}^{15}(b_n - b_n)2^{-n} - 2^{-15}\right]\sin\frac{2\pi k}{N} \quad (17)$$

Thus, as in the real multiplier, the real component R can be expressed as a sum of partial products $r_l$ plus an initial condition $r_{IC}$:

$$R = \sum_{l=0}^{3} r_l 2^{-4l} + r_{IC}2^{-12} \quad (18)$$

where $$r_0 = \frac{1}{2}\left[-(a_o - a_o) + \sum_{n=1}^{3}(a_n - a_n)2^{-n}\right]\cos\frac{2\pi k}{N} + \quad (19)$$

$$\frac{1}{2}\left[-(b_o - b_o) + \sum_{n=1}^{3}(b_n - b_n)2^{-n}\right]\sin\frac{2\pi k}{N}$$

$$r_l = \frac{1}{2}\left[\cos\frac{2\pi k}{N}\sum_{n=0}^{3}(a_{n+4l} - a_{n+4l})2^{-n} + \quad (20)\right.$$

$$\left.\sin\frac{2\pi k}{N}\sum_{n=0}^{3}[(b_{n+4l} - b_{n+4l})2^{-n}]\right] \neq o$$

$$r_{IC} = -\frac{1}{2}\left(\cos\frac{2\pi k}{N} + \sin\frac{2\pi k}{N}\right)2^{-3} \quad (21)$$

Similarly, the imaginary component Q may be written as a sum of partial products $q_l$ plus an initial condition $q_{IC}$:

and $$Q = \sum_{l=0}^{3} q_l 2^{-4} + q_{IC}2^{-12} \quad (22)$$

where $$q_0 = \frac{1}{2}\left[-(b_o - b_o) + \sum_{n=1}^{3}(b_n - b_n)2^{-n}\right]\cos\frac{2\pi k}{N} - \quad (23)$$

$$\frac{1}{2}\left[-(a_o - a_o)\sum_{n=1}^{3}(a_n - a_n)2^{-n}\right]\sin\frac{2\pi k}{N}$$

$$q_l = \frac{1}{2}\left[\cos\frac{2\pi k}{N}\sum_{n=0}^{3}(b_{n+4} - b_{n+4})\right]2^{-n} - \quad (24)$$

$$\sin 2\pi k \sum_{n=0}^{3}(a_{n+4} - a_{n+4})2^{-n} l \neq o \quad (25)$$

$$q_{IO} = -\frac{1}{2}\left[\cos\frac{2\pi k}{N} - \sin\frac{2\pi k}{N}\right]2^{-3}$$

Figure 8:
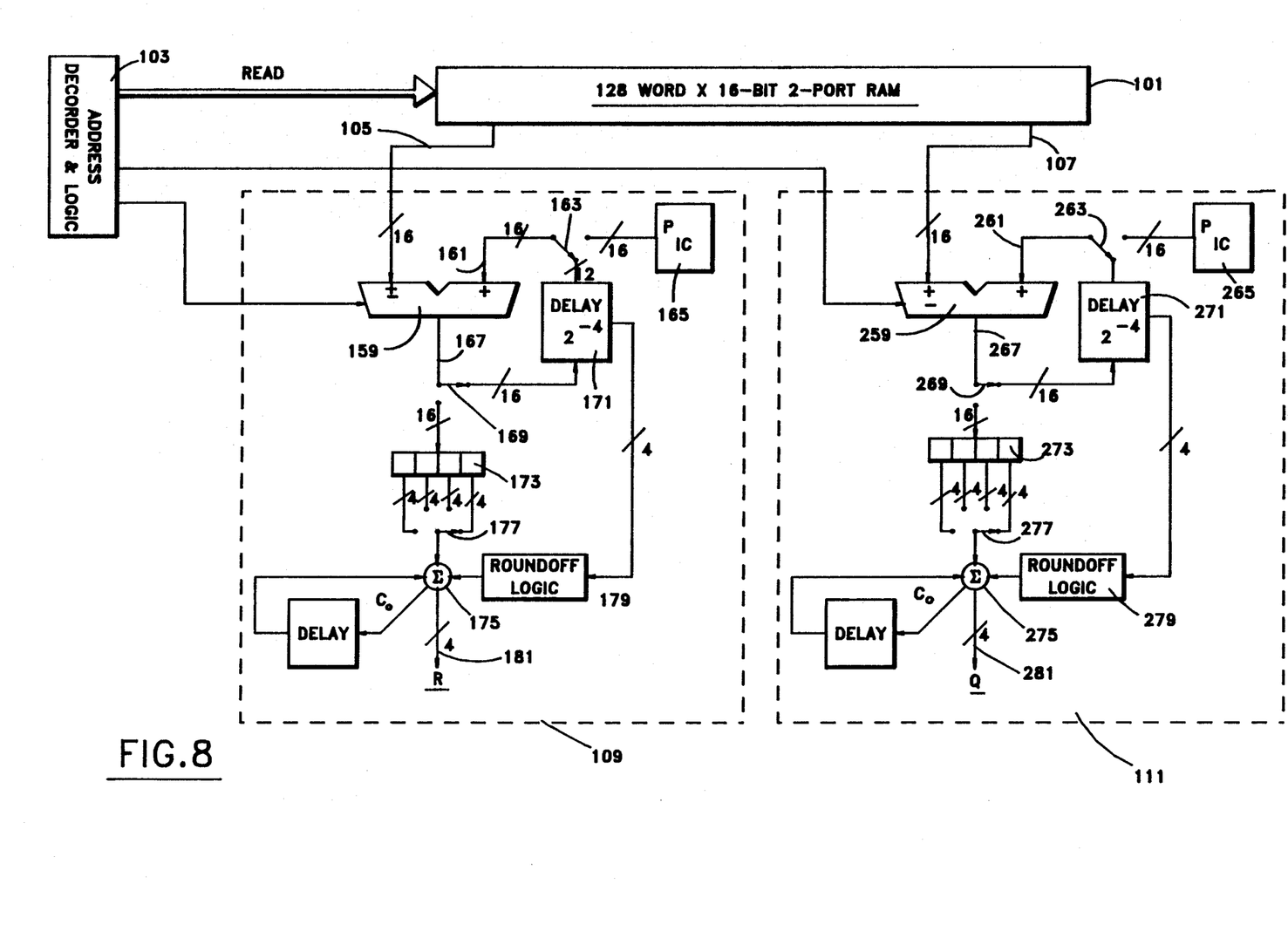
FIG. 8 is a block diagram of a complex multiplier structure.

A suitable exemplary complex multiplier is shown in FIG. 8. The complex multiplier can mechanize the twiddle-factor coefficients for the building blocks of the second and subsequent stages or tiers of the array.

The multiplier includes a two-port random-access memory (RAM) 101. The RAM 101 preferably has capacity for 128 sixteen-bit words. The 128 words stored in the memory are addressed with four real and four imaginary input addressing lines. Although eight address lines would ordinarily require 256 complex words, the count is halved by the use of offset binary coding. The storage count may be further halved again by the use of an orthogonal complex-number system. Consequently, only 64 complex words, or 128 real words must be stored.

Addressing of the memory is provided through address decoder and logic circuitry 103. The two output 105, 107 ports of the memory are connected to two essentially identical summer/accumulators 109, 111. Each summer/accumulator is substantially the same as that of the real multiplier's summer/accumulator 57 described above, and operates in the same manner. One adder/accumulator 109 generates the real portion R of the complex product P, while the other adder/accumulator 111 generates the imaginary portion Q.

In devices in the first tier of an FFT array, in which the multiplier is applying the window coefficients to the input signal, the 128-word memory 101 stores the partial products for the time-domain-weighting of the window coefficients. In devices in the second and subsequent tiers of the array, the memory 101 has stored in it the partial products for the twiddle factors.

The partial products are computed in a partial-product generator, such as that illustrated in FIG. 9.

PARTIAL-PRODUCT GENERATOR

The partial-product generator for a given pair (real and imaginary) of coefficients is shown in FIG. 9. In the structure shown in FIG. 9, the arithmetic is conducted serially. The structure shown in just one of the numerous ways that will be apparent to those skilled in the art to formulate the partial products stored in the memory. Because of the novel construction of the invention, the computation of the partial products may be done at a comparatively leisurely rate, and is not driven by the requirement for processing speed. Thus, simple hardware, equipment, or methods may be used.

In the structure shown in FIG. 9, the bits of the real coefficient portion are loaded and passed through the input, appropriately factored, and loaded into the A registers ($A_o$, $A_l$, etc.). Then, the bit components of the imaginary coefficients may be loaded and passed into the B register ($B_o$, $B_l$, etc.). Finally, the contents of the A and B registers are combined via switches SW1 and SW2 into an output adder, from which they are output on the output line for loading into the appropriate memory locations of the memory 51 (FIG. 5) or 101 (FIG. 8).

OBTAINING THE TWIDDLE FACTOR VALUES

As discussed above, to reduce memory requirements, only minimal coefficient data is stored. The remainder of the coefficient data is generated in the device. The real and imaginary factor components of the twiddle factor are trigonometric functions of k/N. These functions, as is well known, are highly redundant. Thus, to fully know the values of both the cosine and sine functions over the full range of quadrants, only relatively few values of the sine or cosine function need to be computed, with the remainder of the values determined from those. The values for all quadrants may be determined from the values for the first quadrant only. Storage of the values of cos 2 (pi) k/N for one quadrant is sufficient. Thus, only cos 2 (pi) k/64 for k=0, 1, 2, 3, 4, 5, 6, 7, 8, 9, 10, 11, 12, 13, 14, 15, 16 is stored in memory. Thus, for a 64-point FFT, 17 distinct values of the function need to be stored, including the trivial values of zero and unity.

Figure 10:
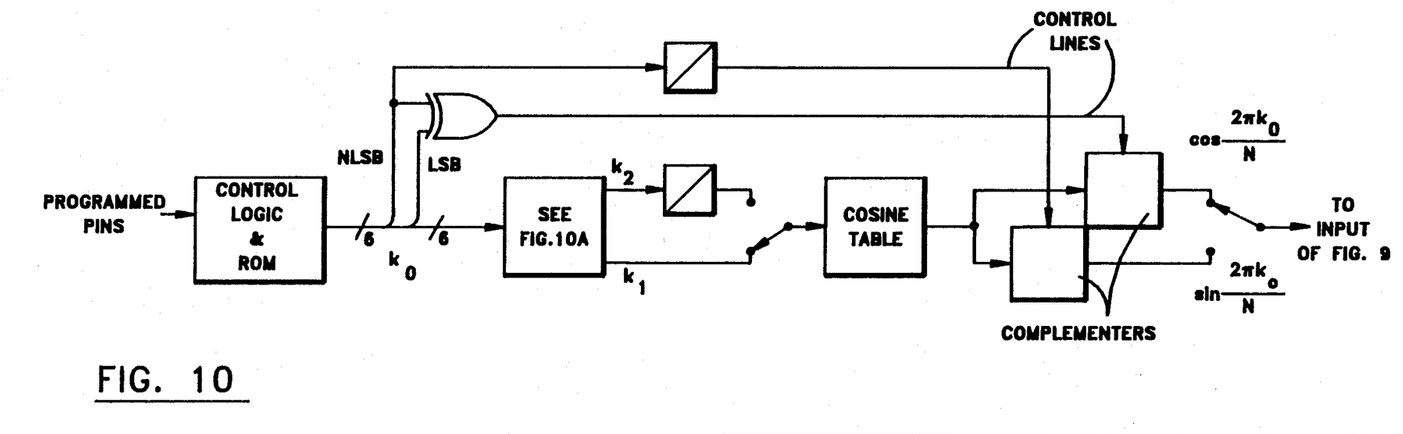
FIG. 10 is a block diagram of a device useful for generating the twiddle-factors for a 64-point transform.
Figure 10A:
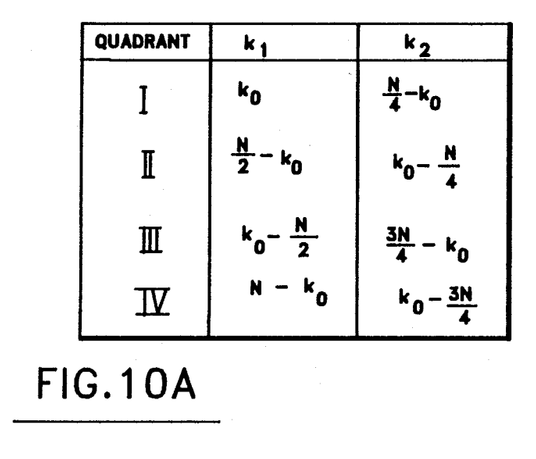
FIG. 10A is a table of stored values useful in computing twiddle-factor coefficients.
Figure 10B:
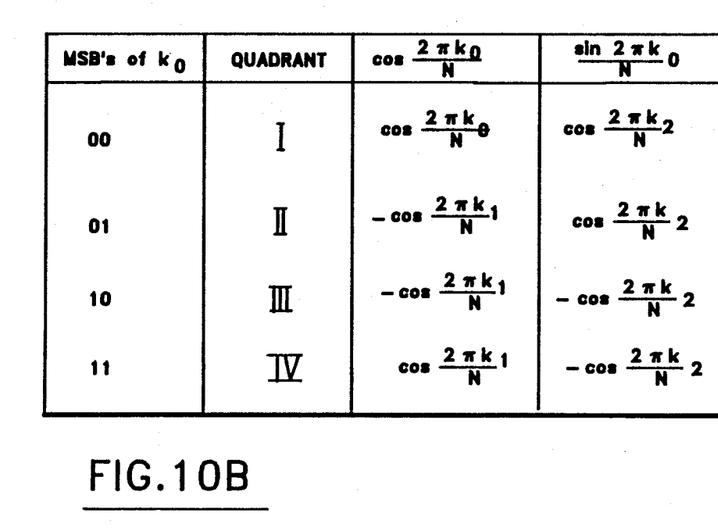
FIG. 10B is another table of values useful in computing twiddle-factor coefficients.

Referring to FIG. 10, a conceptual flow of the functions for generating the partial products that are applied to the partial-product generator of FIG. 9 is illustrated. The programming of the pins of the building block device causes the control logic and the ROM unit to output the three appropriate values of $k_o$ for that device. Each $k_o$ is output as a 6-bit word, as for a 64-point transform, $k_o$ is between 0 and 63. In accordance with the Table in FIG. 10A, the appropriate values of $k_1$ and $k_2$ may be extracted and used to address the cosine table. The cosine values are complemented as indicated in the table of FIG. 10B, and then provided to the input of the partial-product generator shown in FIG. 9. The cosine values are complemented in the complementers if the control value on the associated control line is 1. The partial products are then loaded into the RAMs of the table-lookup complex multipliers shown in FIG. 8.

Larger size transforms of larger than 64 points, but no larger than 1024 points, may be accommodated by generating the appropriate twiddle factors through complex multiplication because 1024 points are 16×64 points, a combined use of the values of the twiddle factors from the 64-point FFT may be used to generate the twiddle factors for a 1024-point transform, using only an additional nine complex words, which may be stored in an auxiliary (synergist) memory.

THE COMPLETE BUILDING BLOCK

Figure 11:
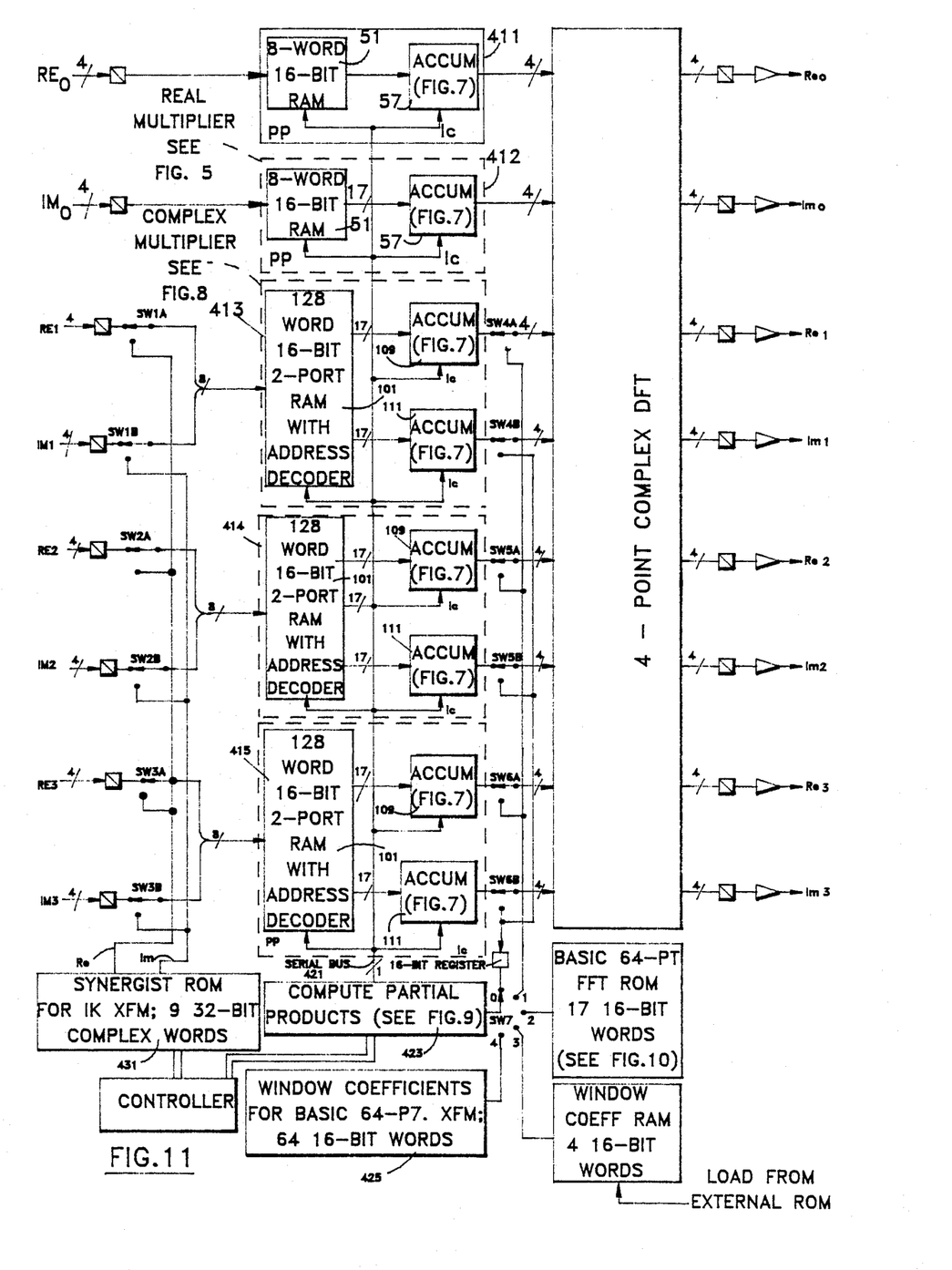
FIG. 11 is a block diagram of the four-point DIT FFT building block of the invention.

FIG. 11 shows the overall structure of the complete building block device. The complete structure of the building block includes real multipliers as described above for each input channel. Preferably, the multipliers 411, 412 on the real and imaginary input lines of the first channel, REO, IMO, are real multipliers as described above in connection with FIG. 5. The multipliers 413-415 connected to the other input channels are complex multipliers as described above in connection with FIG. 8. The multipliers 411-415 of those devices that are in the first tier of devices of the FFT array will multiply their inputs by window coefficients. The window-coefficient partial products are provided to the multipliers over a serial bus 421 from the partial product computer 423. The partial-product computer 423 receives its inputs from several sources through the switch SW7. The switch SW7 picks up the window coefficients during the initialization cycle, either from the basic window ROM 425 from which the proper four values are selected according to the pin-programming switch (position 4), or from the window-coefficient RAM into which the appropriate four window-coefficient values have been stored switch (position 3). The window-coefficient RAM is used for transform sizes other than 64 points in the exemplified embodiment, or for window functions other than the one that is prestored in the window-coefficient ROM. The window-coefficient RAM is loaded from an external ROM or from some other appropriate external device.

The partial-product generator 423 converts the inputs from the window-coefficient ROM 425 or the window-coefficient RAM 427 into partial products, and then loads those partial products into the initial-condition registers (IC inputs) of the accumulator sections of the multipliers 411-415, and into the partial-product memory inputs (PP) of the multipliers.

For building-block devices in the second and subsequent tiers of the FFT array, the partial-product computer 423 computes the partial products for the twiddle-factor coefficients. The switch SW7 is connected in ppsition 2. The basic FFT ROM 429 stores the required 17 values of the cosine function, as described above. Through the partial-product generator 423, the appropriate partial products for the twiddle factors of the transform of up to 64 points are formed and loaded into the multipliers 411-415. For a transform greater than 64 points, the complex products may be generated by multiplying the 64-point-transform twiddle factors by complex values that are stored in the synergist ROM 431. The synergist values for the first complex multiplier 413 are loaded through the switches SW1A and SW1B on the device building block input lines. The output from the multiplier 413 then becomes the new twiddle factor. With the switches SW4A and SW7 in position 1, the real component may be loaded into the partial-product generator 423. Through the switch SW4B, the imaginary component may be loaded into the 16-bit register. Next, the contents of that 16-bit register are loaded into the partial-product generator via the switch SW7 in position 0. The new twiddle-factor partial products are generated, and may be loaded back into the RAM 101 of the first complex multiplier 413 and the initial condition registers in the accumulators 109, 111 associated with that multiplier.

In a similar fashion, the partial products for the complex multipliers 414, 415 may also be generated and loaded.

After the just-described initialization phase, the front end of the FFT building block is now ready to process data. The outputs of the accumulators are now able to drive a four point complex DFT.

COMPLEX FOUR POINT DFT

The complex 4-point DFT is preferably a multiplier-free collection adders to implement the classic computation:

$$X_k = \sum_{n=0}^{3} X_n(-j)^{nk} \quad k = 0,1,2,3 \tag{26}$$

Figure 12:
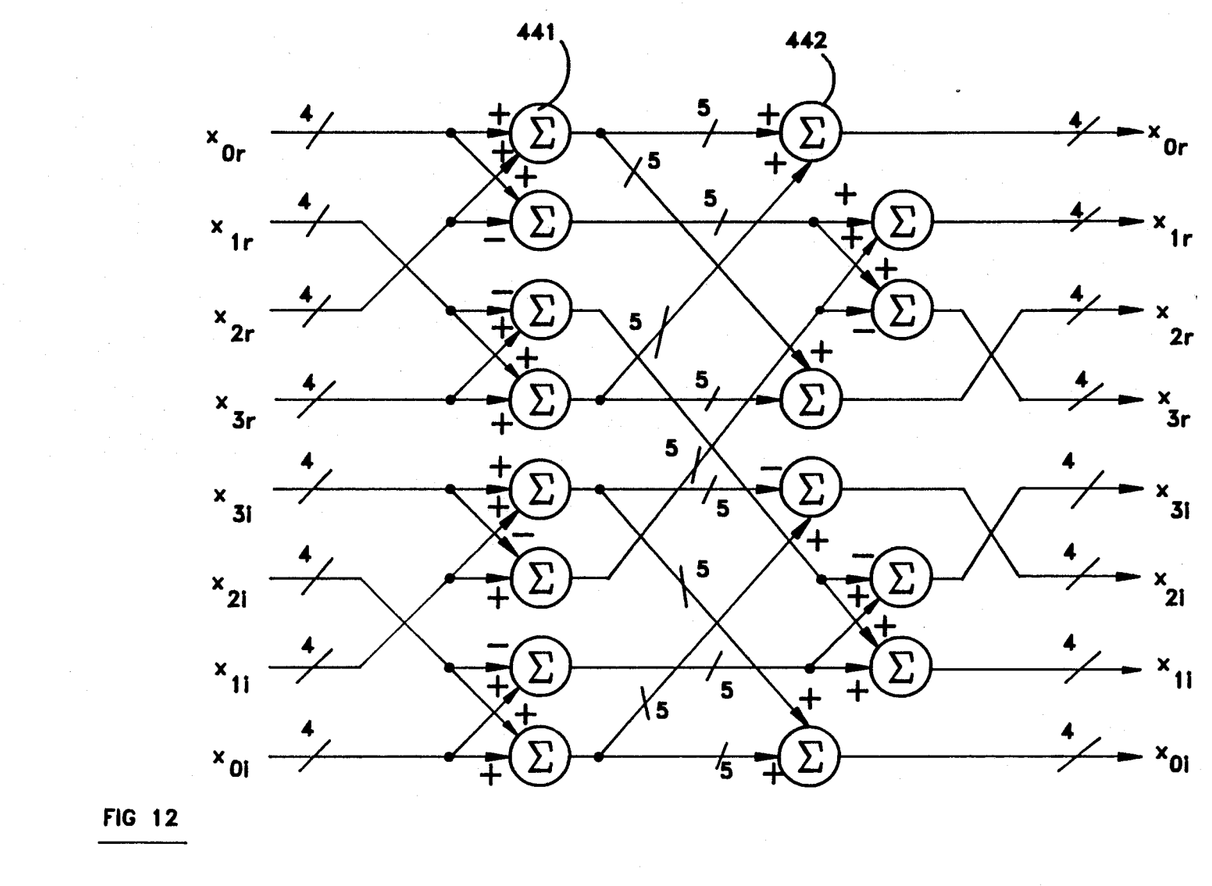
FIG. 12 is a functional diagram of the organization of a four-point complex DFT useful in the building block of the invention.

FIG. 12 shows a four-point complex Discrete-Fourier Transform device (DFT) that can be used in the system illustrated in FIGS. 1, 2, 3, 4, and 11. The DFT includes two ranks of adders 441, 442. The adders of the first rank 44 receive 4-bit-wide data inputs and provide 5-bit-wide data outputs. The adders in the second rank 442 receive the 5-bit-wide data inputs from the adders of the first rank, and provide 4-bit-wide data outputs.

Figure 13:
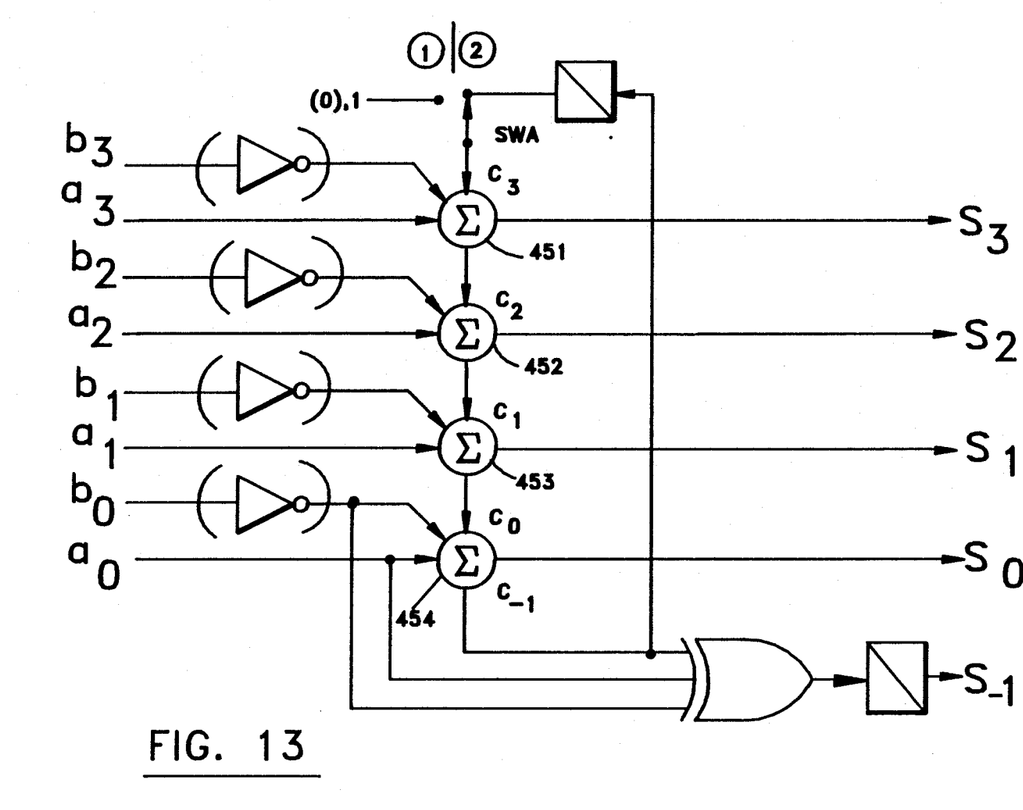
FIG. 13 is a functional diagram of one of eight first rank adders in a four-point complex DFT useful in the building block of the invention.

Each of the eight adders of the first rank may be constructed according to the functional diagram shown in FIG. 13. Referring now to FIG. 13, during the first clock period, the switch SWA may be in position 1. A "0" may be applied if the adder is to add to numbers. A "1" may be applied if one number is to be subtracted from another.

Each adder 451-454 receives three inputs: $a_k$; $b_k$ (if adding is to be done), or $\bar{b}_k$ (if subtracting is to be done); and the carry input $c_k$. Each adder produces two outputs. One is the sum out ($S_k$), and the other is the carry out ($C_{k-1}$). In one clock period the data must pass (via the carry lines) through four adders. During the clock periods 2, 3, and 4 the switch SWA is in position 2, so the carry value $C_{k-1}$ is caught in the latch, and applied to the first adder via the switch SWA. During the last clock period, a sign-spreading operation may be applied to accommodate overflow on the line $S_{-1}$, so that during the 4th clock period, a 5-bit-wide data of interest, or the equivalent of a 17-bit word, is applied on the output lines.

Figure 14:
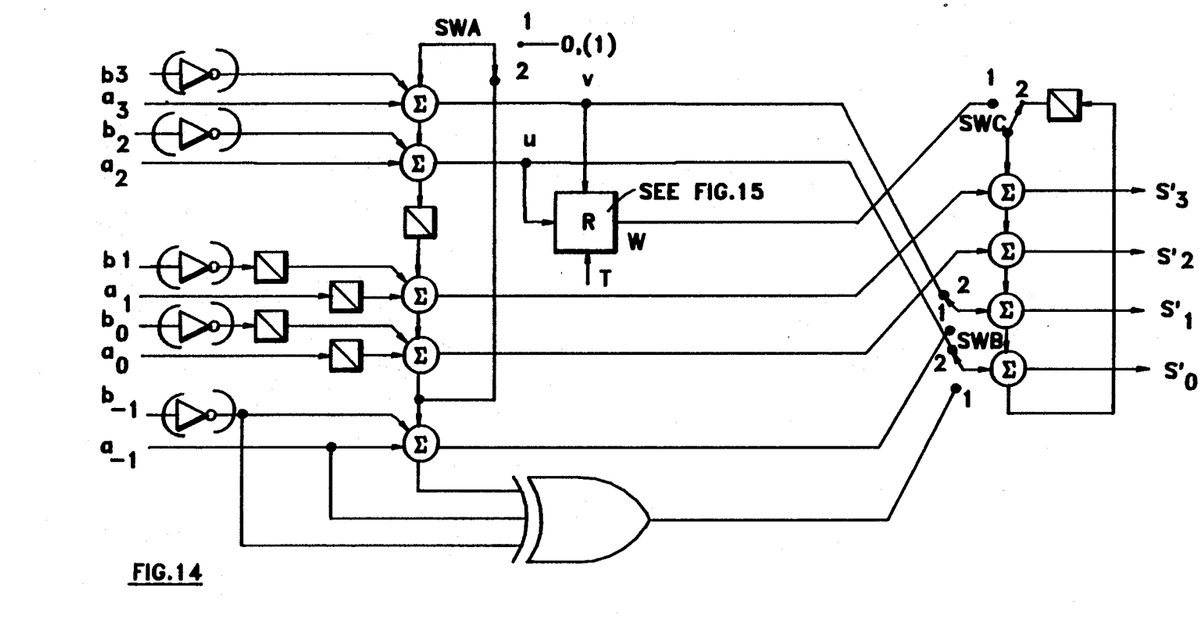
FIG. 14 is a functional diagram of one of eight second rank adders in a four-point complex DFT useful in the invention.
Figure 15:
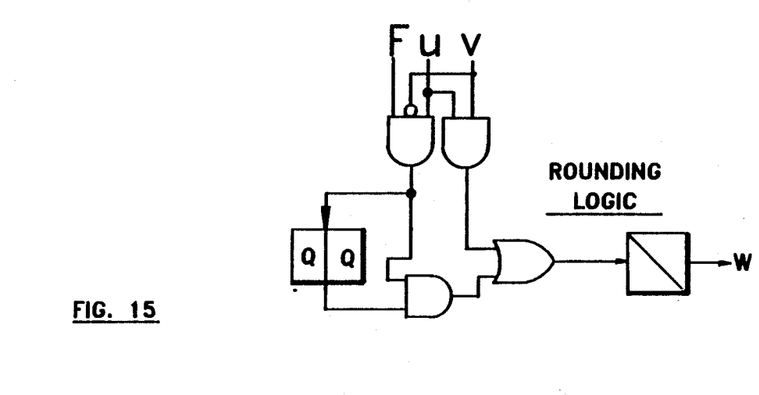
FIG. 15 is a functional diagram of a circuit that may be used in the functional diagram of FIG. 14 for rounding.

The outputs from the adders shown in FIG. 13 are applied to a second rank of adders 442 as shown in FIG. 12. The second rank of adders of FIG. 12 is shown in FIG. 14. The pair of 17-bit words may be added or subtracted to form an 18-bit word that is then rounded down to form a 16-bit word again. During the clock periods 1, 2, 3, and 4, the circuitry on the left side of FIG. 14 generates outputs with 4, 4, 4, and 6 bits, respectively. The circuitry shown on the right side of FIG. 14 rounds off the two least-significant bits and of the 18-bit word properly formats the data back to being 4-bits wide in each clock period. The rounding logic used in the adder is shown in more detail in FIG. 15.

Figure 16A:
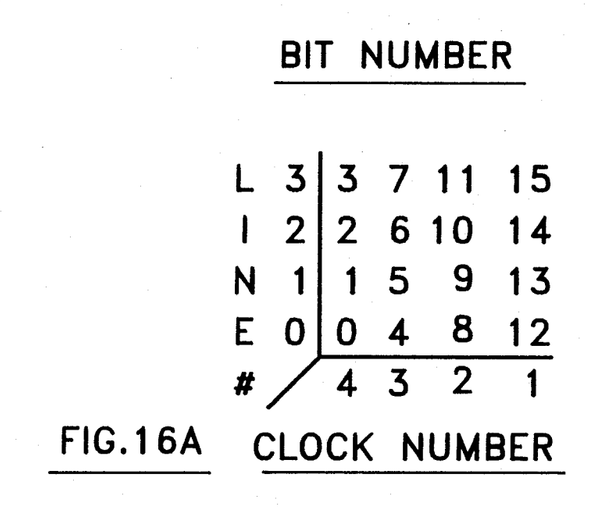
FIGS. 16A–16D are tables showing the bit format of data in the Discrete Fourier Transform illustrated in FIG. 12.
Figure 16B:
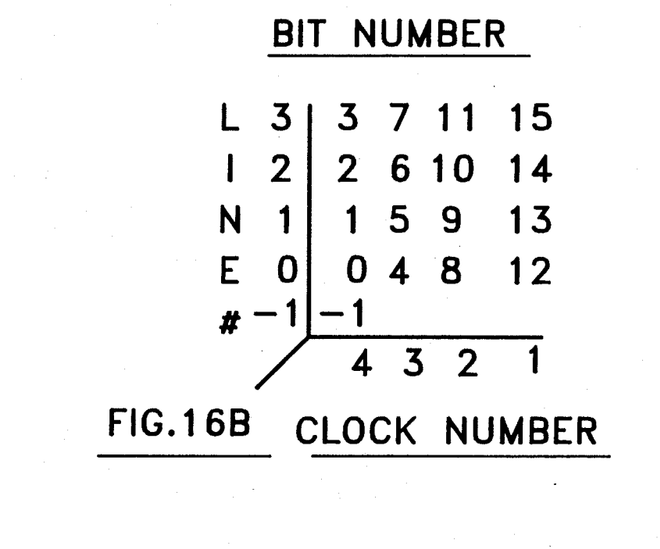
Figure 16C:
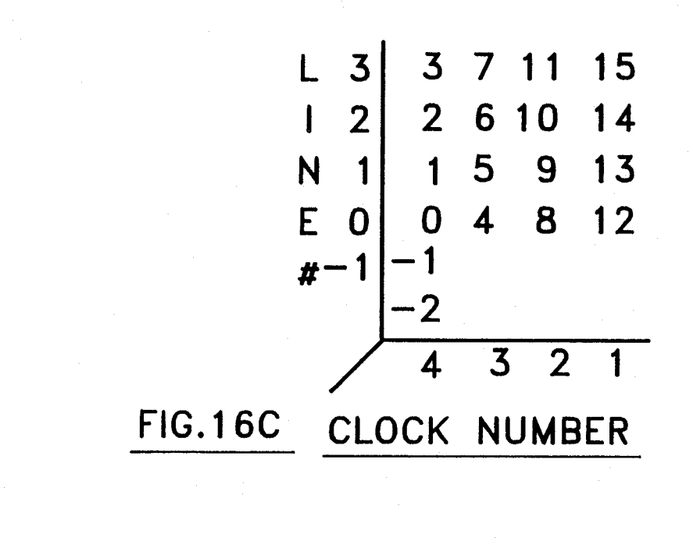
Figure 16D:
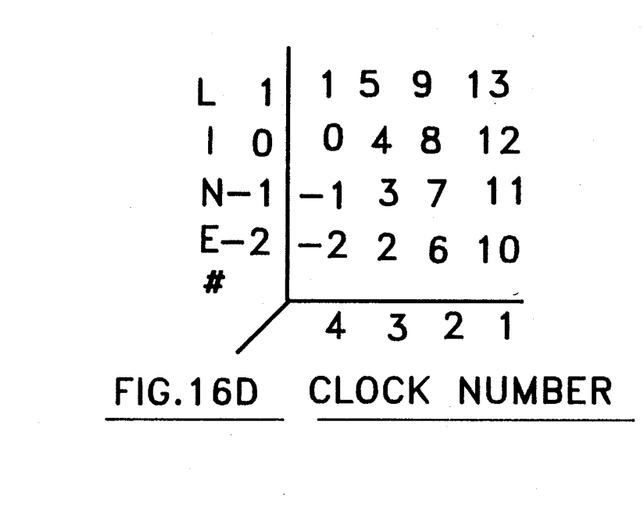

The formatting of the data is in accordance with the tables of FIGS. 16A, 16B, 16C, and 16D. The table of FIG. 16A shows the input-bit pattern to the first tier of adders of the DFT of FIG. 12. The output-bit pattern from the first tier of adders is shown in FIG. 16B. That bit pattern is, of course, also the input bit pattern to the second tier of adders. FIG. 16C illustrates the output-bit pattern from the second tier of adders into the roundoff bank, without delays and scrambling. The table of FIG. 16D shows the output-bit pattern from the second tier of adders into the roundoff bank with delays and scrambling. The bits are unnumbered for the final bit pattern, so it is identical to the input bit pattern for the first tier of adders.

I claim:

1. A fast-fourier-transform (FFT) building-block device for constructing a radix-four windowing FFT comprising:
   a discrete-Fourier-transform structure (DFT) having a plurality of DFT input lines;
   a plurality of multipliers, each having a multiplier input line and a multiplier-output line, wherein the multiplier-output line of each multiplier is connected to a corresponding DFT-input line, and wherein each multiplier implements distributed arithmetic multiplication to produce at the multiplier output a value corresponding to a combination of a value on the multiplier input line and a predetermined multiplier coefficient; and
   a plurality of addressing means, each connected to the multiplier input line of a corresponding multiplier, each for supplying to said corresponding multiplier on said multiplier input line a complex thirty-two bit input word at the rate of four real bits and four imaginary bits per clock period.

2. The building block device of claim 1, wherein each multiplier includes memory having a memory output and having stored in it partial products for implementing distributed arithmetic multiplication of windowing coefficients and the four real bit and four imaginary bits supplied by said addressing means inputs per clock period, and each multiplier additionally includes an accumulator connected to the memory output for accumulating the partial products over a plurality of clock periods.

3. The building-block device of claim 2, additionally comprising a partial-product computer for computing the partial products and reading the partial products into the memories.

4. The building block device of claim 2 wherein each of said addressing means comprises an eight-bit input terminal.

5. The building block device of claim 1 wherein each of said eight-bit input terminals comprises a four-bit real input terminal and a four-bit imaginary input terminal.

6. A building block for use in constructing a Fast-Fourier Transform (FFT) apparatus, comprising:
   a plurality of addressing means, each for supplying a thirty-two bit complex number at the rate of four real bits and four imaginary bits per clock period;
   a plurality of multipliers, wherein each multiplier is coupled to one of said addressing means, and wherein each multiplier comprises:
   a memory having an address input coupled to one of said addressing means for receiving from said addressing means said thirty-two bit complex number at the rate of four real bits and four imaginary bits per clock period, and said memory additionally having two output ports, wherein said memory has stored in it partial products and wherein said memory reads out during each clock period onto the output ports the partial product stored at an address corresponding to the portion of said thirty-two bit word received on the address input during said clock period;
   means for storing a plurality of said partial products in the memory;
   an accumulator coupled to each output port of the memory for combining the partial products into an output product; and
   an output line; and apparatus for implementing a Complex-Discrete-Fourier Transform (DFT) having its inputs coupled to the output lines of the multipliers for computing a four-point DFT.

7. The building block device of claim 5 wherein said addressing means comprises a plurality of input lines.

8. The universal building block of claim 6, additionally comprising a partial product computer for generating said partial products and reading said partial products into said memories.

9. A building block structure for constructing a radix-four windowing Fast Fourier Transform (FFT), comprising:
   an address terminal for supplying over four clock periods four 32-bit complex data words, each comprising 16 real coefficient bits and 16 imaginary coefficient bits, wherein said address terminal comprises:
   a first eight-bit address line comprising a first four-bit real address line for supplying during each of said clock periods four bits of said real coefficients of said first complex data word, and a first four-bit imaginary address line for supplying during each clock period four bits of said imaginary coefficients of said first complex data word;
   a second eight-bit address line comprising a second four-bit real address line for supplying during each of said clock periods four bits of said real coefficients, and a second four-bit imaginary address line for supplying during each of said clock periods four bits of said imaginary coefficients of said second complex data word;
   a third eight-bit address line comprising a third four-bit real address line for supplying during each clock period four bits of said real coefficients, and a third four-bit imaginary address line for supplying during each of said clock periods four bits of said imaginary coefficients of said third complex data word;

a fourth eight-bit address line comprising a fourth four-bit real address line for supplying during each clock period four bits of said real coefficients, and a fourth four-bit imaginary address line for supplying during each of said clock periods four bits of said imaginary coefficients of said fourth complex data word; first, second, third, and fourth multipliers, each coupled to a corresponding one of said address lines, wherein:

said first multiplier comprises a pair of real multipliers, each comprising a table look up memory having address lines connected to said first address line and having an output line, and an accumulator connected to the output line of said memory, said accumulator having an output line forming an output line of said multiplier; and each of said second, third, and fourth multipliers comprises a table look-up memory having its address lines connected to a corresponding one of said address lines and having an output line, and an accumulator connected to the output line of said memory, each of said accumulators having an output line forming an output line of the associated multiplier, and a four point complex Discrete Fourier Transform structure having input lines connected to corresponding output lines of said multipliers, and having output lines.

10. The building block of claim 9, additionally comprising means for generating distributed arithmetic partial products for windowing coefficients, and storing said partial products in said table look up memories.

11. A fast-Fourier-transform (FFT) building-block device for constructing a radix-four windowing FFT comprising:

a discrete-Fourier-transform structure (DFT) having a plurality of DFT input lines;

a plurality of multipliers, each having a multiplier input line and a multiplier-output line, wherein the multiplier-output line of each multiplier is connected to a corresponding DFT-input line, and wherein each multiplier implements distributed arithmetic multiplication to produce at the multiplier output line a value corresponding to a combination of a value on the multiplier input line and a predetermined multiplier coefficient;

means connected to each of said multiplier input lines for transferring to said multiplier input line a complex thirty-two bit input word at the rate of four real bits and four imaginary bits per clock period.

12. The building block device of claim 11 wherein each of said multipliers comprises a memory having stored in it distributed arithmetic partial products of windowing coefficients, and an accumulator.

13. A method of performing a radix-four windowing FFT comprising:

addressing each of a plurality of table look-up memories with a complex input number at the rate of four real bits and four imaginary bits per clock period over a plurality of clock periods, wherein each of said memories has stored in it distributed arithmetic partial products;

reading from each of said memories each clock period distributed arithmetic partial products corresponding to said bits; and performing a discrete Fourier transform function on the partial products read from said memories.

14. The method of claim 13, wherein each of said complex input numbers comprises a thirty-two bit complex number and said plurality of clock periods comprises four clock periods.

15. The method of claim 13, additionally comprising, prior to said step of addressing said memories, computing said partial products and storing said partial products in said memories.

16. The method of claim 13, wherein said step of addressing said table look-up memories comprises, for each of said memories;

addressing a first memory portion with said four real bits each clock period; and addressing a second memory portion with said four imaginary bits each clock period.

17. The method of claim 16, wherein said step of reading from said memories comprises:

reading from each of said first memory portions a real partial product; and reading from each of said second memory portions an imaginary partial product.

18. The method of claim 17, additionally comprising, for each of said table look-up memories:

accumulating said real partial products over said plurality of clock periods; and accumulating said imaginary partial products over said plurality of clock periods.

19. The method of claim 18, wherein each of said complex input numbers comprises a thirty-two bit complex number and said plurality of clock periods comprises four clock periods.

20. The method of claim 19, additionally comprising, prior to said step of addressing said memories, computing said partial products and storing said partial products in said memories.

* * * * *